Aug. 25, 1925.　　　　　　　　　　　　　　　　　　　1,551,526
F. O'NEILL
GLASS FEEDING APPARATUS
Filed Jan. 2, 1923　　　　5 Sheets-Sheet 1
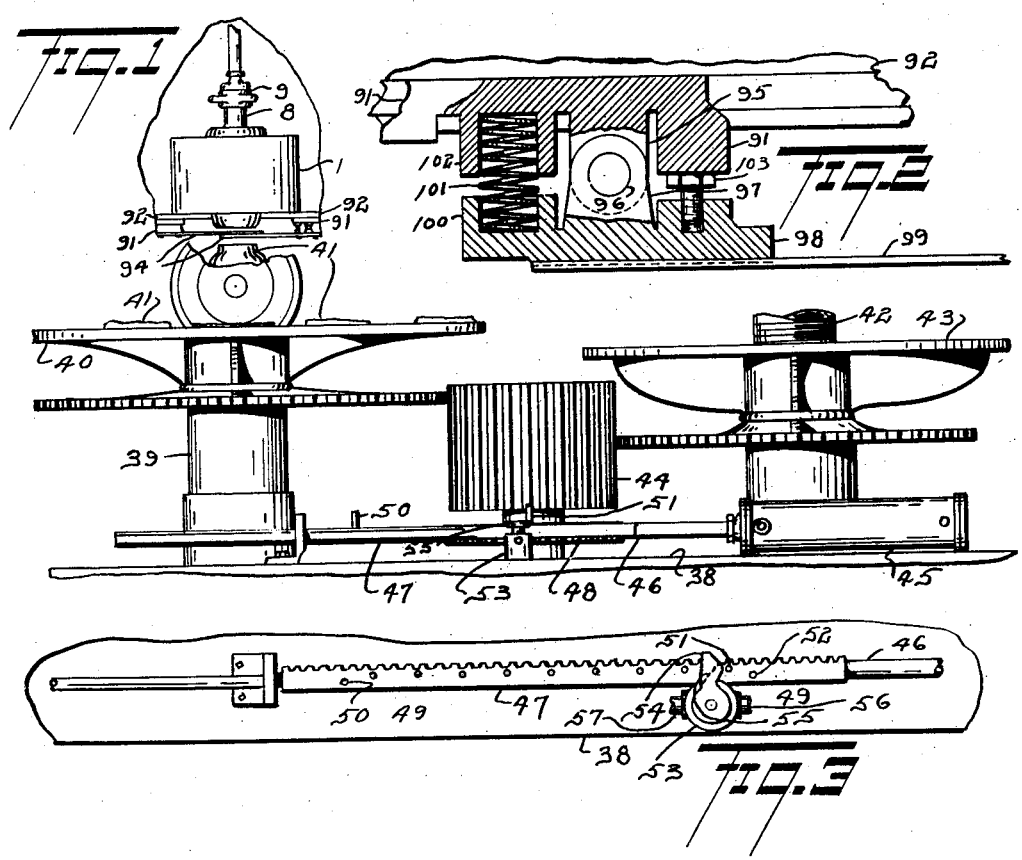
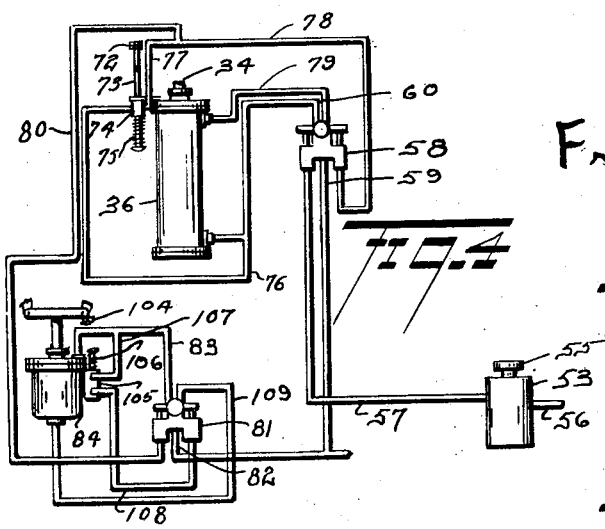
Frank O'Neill
INVENTOR
BY
ATTORNEY

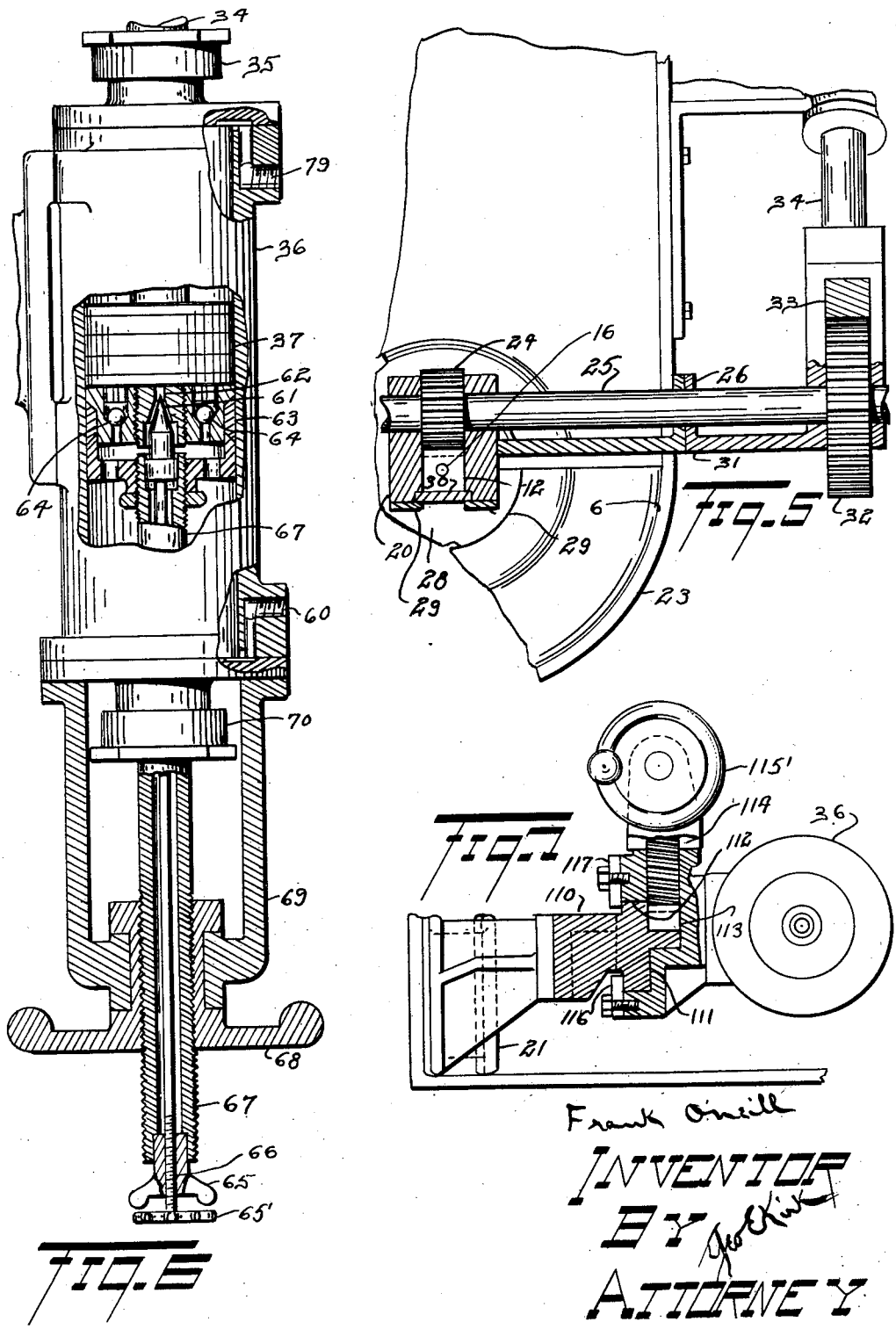

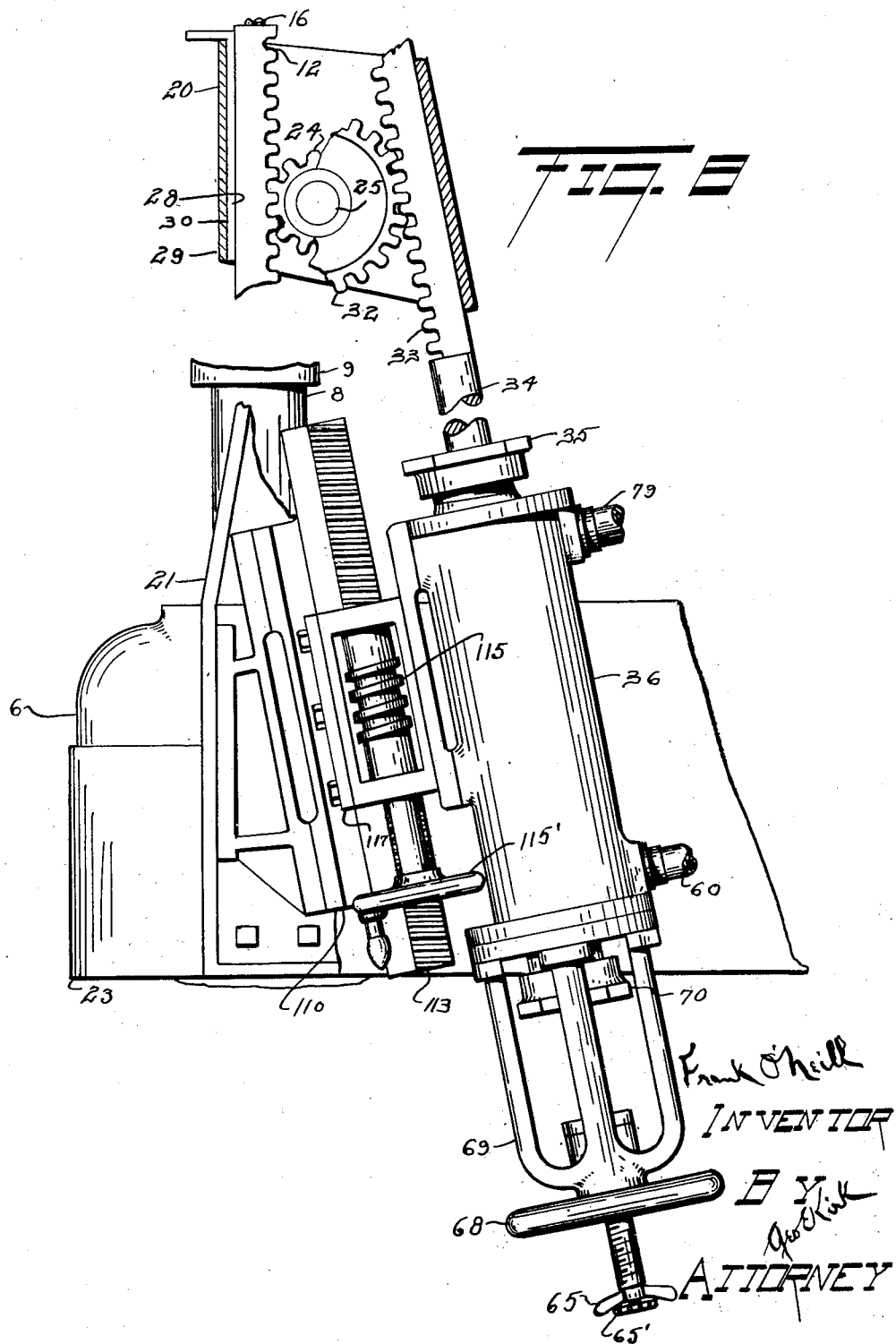

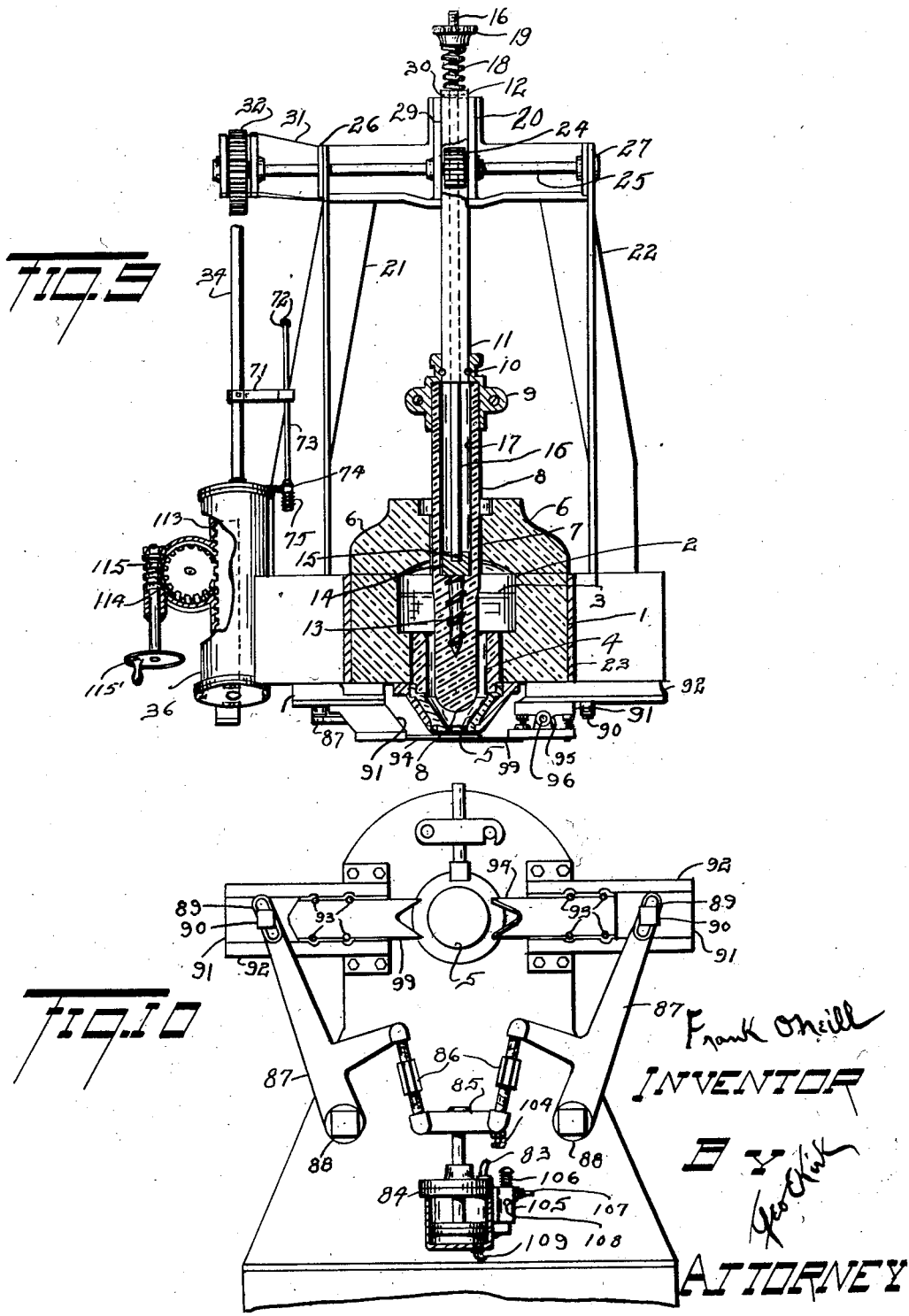

Aug. 25, 1925. 1,551,526
F. O'NEILL
GLASS FEEDING APPARATUS
Filed Jan. 2, 1923 5 Sheets-Sheet 5
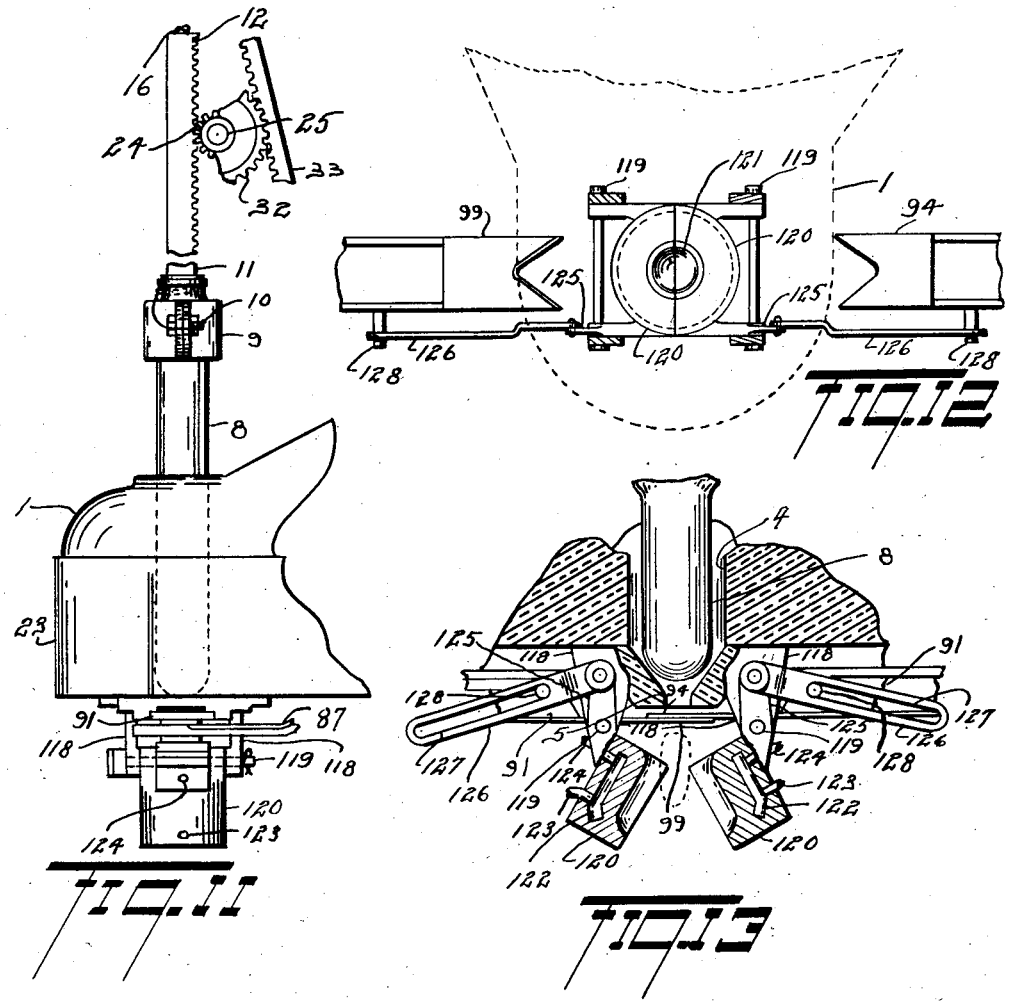
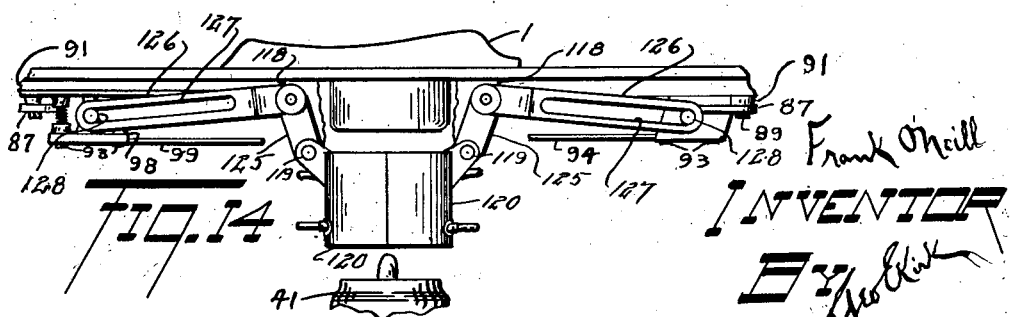

Patented Aug. 25, 1925.

1,551,526

UNITED STATES PATENT OFFICE.

FRANK O'NEILL, OF TOLEDO, OHIO.

GLASS-FEEDING APPARATUS.

Application filed January 2, 1923. Serial No. 610,187.

*To all whom it may concern:*

Be it known that I, FRANK O'NEILL, a citizen of the United States of America, residing at Toledo, Lucas County, Ohio, have invented new and useful Glass-Feeding Apparatus, of which the following is a specification.

This invention relates to molten glass feeding mechanisms.

This invention has utility when incorporated in connection with the removing or flowing of molten glass from a pool or furnace, supplying such molten glass in adjustable determined volume or quantities from a stream at different rates.

Referring to the drawings:

Fig. 1 is a fragmentary view of an embodiment of the invention mounted at the overhang of a glass tank or furnace, with a bottle machine in position to be supplied;

Fig. 2 is a detail view on an enlarged scale showing in section features of yieldable knife mounting for one of the blades of the shear as severing the glass stream as emerging from the tank, the flow of which stream is modified by the plunger mechanism herein;

Fig. 3 is a fragmentary view in plan of the bottle machine main control valve for the feeder;

Fig. 4 is a diagrammatic view of the piping for the power control;

Fig. 5 is a plan view of rock shaft of the feeder control, co-operating parts being shown in part;

Fig. 6 is a view of the actuator cylinder and piston, parts being broken away;

Fig. 7 is a horizontal section through the adjustable mounting of the cylinder, the parts in elevation being in bottom plan;

Fig. 8 is a side elevation of the actuator in operative position as mounted on the furnace overhang;

Fig. 9 is a transverse section through the furnace overhang and plunger, with the actuating connections, the cylinder being partially broken away to show features of the cylinder adjustment;

Fig. 10 is a bottom plan view of the overhang showing the shear;

Fig. 11 is a fragmentary side elevation of this feed device equipped with a gather forming cup;

Fig. 12 is a plan view of the cup closed, and actuating connections from the shear;

Fig. 13 shows the operating connections for the cup, the cup and tank outlet being shown in section; and Fig. 14 shows the cup in closed position at right angles to the showing in Fig. 11.

From a glass tank or furnace there is overhang 1 having a top opening 2. The tank or molten glass supply may maintain a level of the molten metal 3 in this overhang below the opening 2 for flowing in a stream by way of well 4 out bottom throat or opening 5. Refractory sections 6 may close the opening 2 (Fig. 9) and provide a central way 7 in alignment with the well 4 for refractory plunger 8. The upper portion of this refractory plunger 8 is embraced by clamp 9 anchored by U-pin 10 with upwardly extending tubular member 11 carrying rack 12, near its upper terminus. In the lower end of the refractory plunger 8 is tapered threaded plug 13 having shoulder 14 connected by pin 15 with vertical rod 16 extending upwardly through tubular portion 17 of the plunger 8. This rod 16 extends through the member 11 beyond the rack 12, and has thereon helical compression spring 18, adjusted by knurled nut 19. This rod 16 accordingly is expansible with heat, as it is of metal, but in such expansion at a different rate than the plunger 8, the lower working extremity of the plunger is always kept supported, for the plug 13 has distributed and stiffening engagement in the plunger, and the spring 18 maintains upward pull on the rod 16, not only pulling the plunger up against the clamp 9, but in so doing gives greater rigidity to the plunger in its vertical reciprocations.

There is directing guide 20 for the rack 12. This guide 20 is carried by uprights 21, 22, mounted on overhang housing or reinforcement 23. The guide 20 holds the rack 12 into mesh with pinion 24 on rock shaft 25 mounted in bearings 26, 27, carried by the uprights 21, 22. This guide 20 (Figs. 5, 8) has an open side 28, away from the shaft 25, with ways 29 for a removable keep 30. The plunger 8 may be shifted to the upper position out of the well 4, the keep 30 removed, and with the refractory sections 6 shifted to enlarge the opening 7, the plunger 8 may be removed for care or replacement with a mimium of loss of time incidental thereto.

Extending outward from the upright 22 (Fig. 9) from adjacent the bearing 26 is bracket 31 embracing pinion 32 at the end of the shaft 25 to hold rack 33 in mesh therewith. This actuating pinion 32 for the rock shaft 25 is larger than the follower pinion 24, resulting in a less travel distance for the rack 12 and at a reduced speed as to the rack 33. Fast with this rack 33 is piston rod 34 extending in an inclined direction downwardly to pass through gland 35 and then into inclined cylinder 36 to piston 37 (Fig. 6).

The glass bottle machine is herein shown as a truck or base 38 having column 39 supporting blank mold table 40 carrying a series of blank molds 41 to receive charges of molten glass from the furnace by way of the opening 5 from the bottom of the overhang 1. This base 38 also carries column 42 supporting blow mold table 43. Intermediate the tables 40, 43, is gear 44. Main drive cylinder 45 below the blow mold table 43, has piston rod 46 provided with rack 47 in mesh with gear 48 for effecting intermittent one direction of rotation to the mold tables simultaneously. This piston rod 46 has openings 49 for pins 50, 51, 52.

Adjacent the rod 46 is disposed valve 53 having rocking control lever 54 with ledge 55. The rod 46 moves outward in its idle stroke and inward during its driving stroke. In the driving stroke the pin 51 engages the ledge 55 and rocks the lever 54 toward the cylinder 45, in the early portion of the drive stroke, and allows flow of a puff of power air from line 56, past the valve 53 by way of line 57 to rocker valve 58 (Fig. 4). Power line 59 is thus opened to supply air past the valve 58 by way of line 60 to the lower end of the cylinder 36, thus forcing the piston 37 upward. This upward travel of the piston 37 continues until the end of the travel in the cylinder 36, and until the drive piston rod 46 brings the pin 50 to further rock the lever 54, to close off the line 57. This upward travel of the piston 37 means a downward travel of the plunger 8. This travel of the plunger 8 is into the well 4. The reverse travel may be accurately adjusted as to speed by shifting needle valve 61 as to port 62 (Fig. 6) in cylinder head 63. This cylinder head 63 has one way or intake check valve 64 permitting rapid supply of power fluid to the lower portion of the cylinder 36, while the exhaust must be by way the port 62 adjusted to retard the outflow by the needle 61. Wing nut 65 on stem 66 locks such stem as adjusted by wheel 65' in adjustment of the needle 61. Tubular stem 67 from the cylinder head 63 not only houses the stem 66, to maintain the needle valve adjustment, but so mounts the cylinder head 63 as to the cylinder 36, that by rotating the wheel nut 68 swiveled in spider extension 69 from the cylinder 36, the cylinder head 63 may be adjusted to vary the effective length of the stroke of the piston 37 in such cylinder. A gland 70 about the tube 67, confines the power air supply to the cylinder 36 to be effective through the check valves 64 in raising the piston 37.

As the piston rod 46 starts on its return stroke, at once the pin 52 throws the lever 54 to reset the valve 58 for the swing is full to the closed position of starting for the valve 53. Accordingly, the driving stroke effecting shifting of the tables operates the plunger 8 downward in the well 4 to effect acceleration in the flow of the stream of molten glass from the orifice 5, to have such molten glass in readiness at once to drop into the closed blank mold 41 as it comes to a position of rest at the charging station under the overhang 1.

The upward movement of the piston 37 is rapid and positively thrusts the plunger 8 down into the well 4. As the plunger reaches the lower portion of the stroke, and the piston 37 approximates its fixed limit position as to the non-adjustable upper cylinder head of the cylinder 36, adjustable arm 71 (Fig. 9) carried by the piston rod 34, strikes nuts 72 on rod 73 thus pulling valve 74 against the action of spring 75, and allowing flow of power air by way of line 76 from the line 60, to lines 77, 78, to reset the rocker valve 58, and permit power air flow from the line 59 by way of line 79 to the upper end of the cylinder 36. The retarded withdrawing travel of the plunger 8 is thus effected to hold the stream, or rather lag the molten glass flow, as well as draw such off the shear. The piston 37 is at rest during the driving or idle stroke of the piston rod 46, thus permitting the viscous molten glass to have an interval for flow through the well 4 and out the opening 5, as the shears have been withdrawn at once the cutting off occurs.

The shearing operation is brought about by line 80 as a branch from the line 77. The line 80 extends to rocker valve 81 and shifts such valve to permit supply of power air from line 82 as a branch from the line 59. As so shifted, this valve 81 permits flow of power air by way of line 83 (Fig. 10) to cylinder 84 for thrusting crosshead 85 toward this cylinder 84, and through links 86, simultaneously rocking pair of arms 87 toward each other as swinging about fulcra 88. The arms 87 have slots 89 at their free ends engaging pins 90 fixed with blocks 91 reciprocable in fixed guides 92 as operated by the levers 87. Bolts 93 fix notched knife blade 94 with one of the slidable members or blocks 91. The other block 91 (Fig. 2) is provided with depending ears 95 for engaging pivot pin 96 through ears 97 of block 98 fast with notched blade 99 operable to co-operate with the blade 94. This blade or knife 99 is yieldably held to slide against the face of the blade 94 as they move into overlapping position with their notched portions in registry for centrally of the glass stream severing a molten section therefrom to drop into the pair of opposing blank mold sections closed to provide blank mold 41 therebelow. The member 98 (Fig. 2) remote from the blade 99 has a socket 100 for a helical compression spring 101 also extending into socket 102 of the block 91. The extent of this rocking from the spring 101 is adjusted by bolt 103.

As the crosshead 85 approaches the end of its inward stroke, adjustable bolt 104 carried thereby, strikes the stem valve 105, and forces it against the action of spring 106, to connect line 107 from the line 83, to line 108, for resetting the valve 81, so that the power air from the line 82, passes by way of line 109 to the cylinder 84 for moving the crosshead 85 away from the cylinder and thereby through the links 86, and levers 87 opening the shear by moving the blades 94, 99, apart.

Fixed with the tank overhang housing 23 is a bracket 110 (Figs. 7, 9) having guide ribs 111, 112, and a rack 113. The cylinder 36 is provided with a mounting extension in which is mounted worm pinion 114 in mesh with the rack 113. This pinion is held against rotation by worm 115, which worm 115 is rotated by hand wheel 115', to effect travel of the pinion along the rack 113, as held by clips 116, 117, to travel along the ribs 111, 112. In this travel of the pinion 115, the cylinder 36 is shifted, so that by this adjustment the length of stroke for the plunger 8 is not modified, but the range of such constant stroke distance is shifted. This means that in expelling a size of stream or accelerating glass from the tank, the plunger may have a stroke of say 7 inches. Should the glass become cooler, or less viscous, so as not to flow so freely, or should an increased rate of discharge be desired, operation of the hand wheel 115' to move the cylinder 36 down, will mean that the travel of the plunger 8 into and out of the well 4 will be the same 7 inch length of stroke, but at the lower position of the plunger 8 it will have greater clearance as to the opening 5, while at its upper position, it will be drawn more nearly out of the pool of molten glass 3.

The adjustment of the cylinder head 63 permits changing of the length of the stroke of the plunger 7 by cutting off or adding to the top end of the stroke of the plunger. Accordingly this adjustment may modify the glass stream control as to the amount of withdrawal of the plunger from the pool, with the limit of downward travel of the plunger into the well 4 a constant as to clearance in such well.

The adjustment of the exhaust valve 61, 62, in the shiftable cylinder head, permits any desired slowing up in the travel of the plunger 8 away from the well outlet 5, and is preferably timed to lift the molten glass stream from the shear as the shear blades 94, 99, are fully closed, or to keep such molten glass from falling thereon or dragging with such blades as they open.

In some practice it may be desirable to provide for forming the gather or holding the gather. To this end there is shown herein a cup the operation of which is controlled by the shear. From the overhang housing 23 ears 118 depend to carry pins 119 parallel to each other, one on each side of the outlet opening 5. Each of these pins 119 carries a gather forming cup section 120. As these cup sections swing together they form a pocket 121 into which a gather may fall or be formed. Each of these cup sections is provided with a cooling chamber or jacket 122 through which may be circulated water as supplied by line 123 and discharged by line 124. These cup sections 120 as pivotally carried on the pins 119 have upstanding arms 125 to each of which is connected a link 126 having remote therefrom a slot 127 engaged by a pin 128 fixed with members 91 of the shears. The length of the slot 127 and its position relatively to the range of travel of the shear members 91 is such that with the shear blades 94, 99, fully apart, the cup sections 120 are closed. As the blades 94, 99, move toward each other the pins 128 move away from the ends of the slots 127 and the cup sections 120 may open or fall apart. This opening or falling apart is positively effected as the blades 94 come into shearing or overlapping position, for at this point the pins 128 strike the inner ends of the slots 127.

The interval of opening of the cup sections 120 is at the shearing and of sufficient duration to permit the gather to drop therefrom. However, as the shear blades 94, 99, open out the cup sections 120 are at once swung back over the falling gather to receive and form the lower extremity of the stream of glass as falling from the opening 5 in the interim of the shear blades being apart.

What is claimed and it is desired to secure by Letters Patent is:—

1. A reservoir for a pool of glass, said reservoir having an opening for a stream of glass therefrom, a plunger for modifying the flow rate of said stream, and an actuator for the plunger including a rock shaft, a piston and cylinder drive for the shaft, power supply means for the cylinder, and adjusting means at the cylinder for positioning a terminus thereof for varying the plunger operation.

2. In the feeding of molten glass from a pool, a plunger, an actuator for the plunger including a rock shaft, a piston and cylinder drive for the shaft, and an adjustable head in the cylinder for affecting the stroke of the plunger.

3. In the feeding of molten glass from a pool, a plunger, a cylinder including connections for operating the plunger, said cylinder being mounted to have its axis extend at an angle to the axis of the plunger, and an adjustable mounting for shifting the cylinder along its axis.

4. In the feeding of molten glass from a pool, a plunger, an actuator for the plunger including a cylinder, a supporting bracket for the cylinder, and a connection between the cylinder and the bracket embodying rotatable means resisting shifting from the cylinder for adjusting the cylinder.

5. In the feeding of molten glass from a pool, a plunger, an actuator for the plunger, and relatively movable elements including a worm for adjusting the position of the actuator for varying the range of the plunger stroke.

6. In the feeding of molten glass from a pool, a plunger, an actuator for the plunger including a rock shaft, a piston and cylinder drive for the shaft, and a shiftable device for adjusting the effective length of the cylinder to vary the plunger stroke length.

7. In the feeding of molten glass from a pool, a plunger, a piston and cylinder actuator for the plunger, a mounting for the actuator, and worm and worm wheel means for changing the position of the actuator as to the mounting for varying the plunger stroke.

8. In the feeding of molten glass from a pool, a plunger, a rock shaft connected to the plunger, a piston and cylinder actuator for the rock shaft, and an adjustable cylinder head in the cylinder for modifying the plunger stroke.

9. In the feeding of molten glass from a pool, a plunger, an actuator therefor including a rock shaft, a piston and a cylinder, and means coacting with the cylinder for changing the relative travel distance of the rock shaft to modify the plunger stroke.

10. In the feeding of molten glass from a pool, a plunger, an actuator therefor including a piston and cylinder, said cylinder having a head, in said head a one-way supply valve, and an adjustable exhaust valve.

11. In the feeding of molten glass from a pool, a plunger, a piston for actuating the plunger, a cylinder for the piston, a rack for adjusting the cylinder, a pinion, a supporting bracket holding the pinion in mesh with the rack, and means for rotating the pinion to effect shifting of the cylinder to vary the range of plunger stroke with the stroke length maintained.

12. In the feeding of molten glass from a pool, a plunger, a piston for actuating the plunger, a cylinder for the piston, a rack and pinion adjustable mounting for the cylinder, and a worm gearing operable through the rack and pinion for shifting the cylinder to change the plunger travel as to the pool of glass with maintenance of the length of plunger stroke.

13. In the feeding of molten glass from a pool, a vertically directed plunger, an inclined piston and cylinder actuator, and connections from said actuator for operating the plunger.

14. In the feeding of molten glass from a pool, a plunger, an actuator for the plunger, an intermediate rock shaft, a pinion on the shaft, a rack fixed with the plunger, a rack guide fixed with the shaft to hold the rack in mesh with the pinion, and a removable keep for the rack permitting shifting of the rack clear of the pinion for ready removal of the plunger from the pool.

15. In the feeding of molten glass from a pool, a plunger, a piston for actuating the plunger, a cylinder for the piston, a supplemental head in said cylinder, and an adjustable needle exhaust valve for the cylinder in said head for modifying the plunger travel rate.

16. In the feeding of molten glass from a pool, a plunger, a piston, a cylinder cooperating with the piston for controlling plunger operation, said cylinder having an adjustable head, and means for slowing up the plunger travel out of the pool including an adjustable needle exhaust valve in said head.

17. A feeder for glass from a tank having a bottom opening, embodying a sectional vessel for closing below the tank opening for intercepting glass flow from the tank, pair of horizontally spaced pivotal mountings for the vessel sections permitting the released vessel sections to swing apart and downward to open below the tank opening, a shear, and a power drive for the shear connected to operate said sections.

18. A feeder for glass from a tank having a bottom opening, embodying a sectional vessel, a pair of laterally spaced fixed pivot bearings for the vessel sections, means for moving the vessel sections on said bearings to closed position toward the opening and downward away from the opening in shifting the vessel sections apart, a shear, and a power drive for the shear connected to control said means.

19. A feeder for glass from a tank having a bottom opening, embodying a pair of fixed pivotal mountings horizontally extending on opposite sides of said opening, a pair of vessel sections swingable from said mountings upward into closed position below the opening, a shear operable between the tank opening and vessel sections for severing glass flow from the tank, and a power drive for the shear connected to operate said sections.

20. A feeder for glass from a tank having a bottom opening, embodying a hinge pin, one on each side of said opening, a vessel section mounted on each hinge pin and swingable to closed position below the tank opening and dropping away from the opening in swinging apart, a shear for severing a gather of glass between the opening and the vessel sections, and power drive for opening the sections in permitting dropping of the gather from the vessel sections as severed by the shear.

21. A feeder for glass from a tank having a bottom opening, embodying aligned slides for notched end shear knives, means for operating the knives into overlapping position below the opening to sever a gather of glass, a sectional gather vessel below the shear, and a pair of links, one having pivotal connection to each section and from such pivotal connection provided with a slot, and a pin fixed with each knife engaging one in each slot for closing the vessel as the shear opens and opening the vessel as the shear closes.

In witness whereof I affix my signature.

FRANK O'NEILL.